United States Patent [19]

Sarumaru

[11] Patent Number: 4,723,901
[45] Date of Patent: Feb. 9, 1988

[54] EXTRUDER FOR RUBBER MATERIALS

[76] Inventor: Kazumasa Sarumaru, 8-27 Kinmitsu-cho, Ashiya 659, Japan

[21] Appl. No.: 30,045

[22] Filed: Mar. 24, 1987

[30] Foreign Application Priority Data

Apr. 1, 1986 [JP] Japan .................................. 61-76347

[51] Int. Cl.$^4$ ............................................. A01J 17/00
[52] U.S. Cl. ..................................... 425/208; 366/80; 366/307
[58] Field of Search ........................ 425/204, 206–209; 366/79, 88, 80, 149, 90, 307, 323, 324

[56] References Cited

U.S. PATENT DOCUMENTS

| | | | |
|---|---|---|---|
| 1,904,884 | 4/1933 | Royle | 425/206 |
| 3,023,455 | 3/1962 | Geier et al. | 425/208 |
| 3,458,894 | 8/1969 | Wheeler | 366/90 |
| 4,640,672 | 2/1987 | Ellwood | 425/208 |

FOREIGN PATENT DOCUMENTS 614441 12/1948 United Kingdom ................. 366/79

Primary Examiner—Bernard Nozick
Attorney, Agent, or Firm—Marshall, O'Toole, Gerstein, Murray & Bicknell

[57] ABSTRACT

This disclosure relates to an extruder including a casing which forms a cylindrical bore and a peripheral passage for a heating or cooling medium around the bore. A screw is mounted in the bore and axially fixed to the casing, but adapted to be rotated in the bore. The screw has a thread forming a spiral passage for rubber materials in the bore. A number of projections extend from the casing and into the spiral passage, and the thread is formed with notches for the projections to pass through as the screw rotates. A cylindrical sleeve is mounted within the casing and supports the projections. The casing and the sleeve are divided or split into at least two parts, and lock means is provided on the casing to lock the parts together during operation.

4 Claims, 13 Drawing Figures

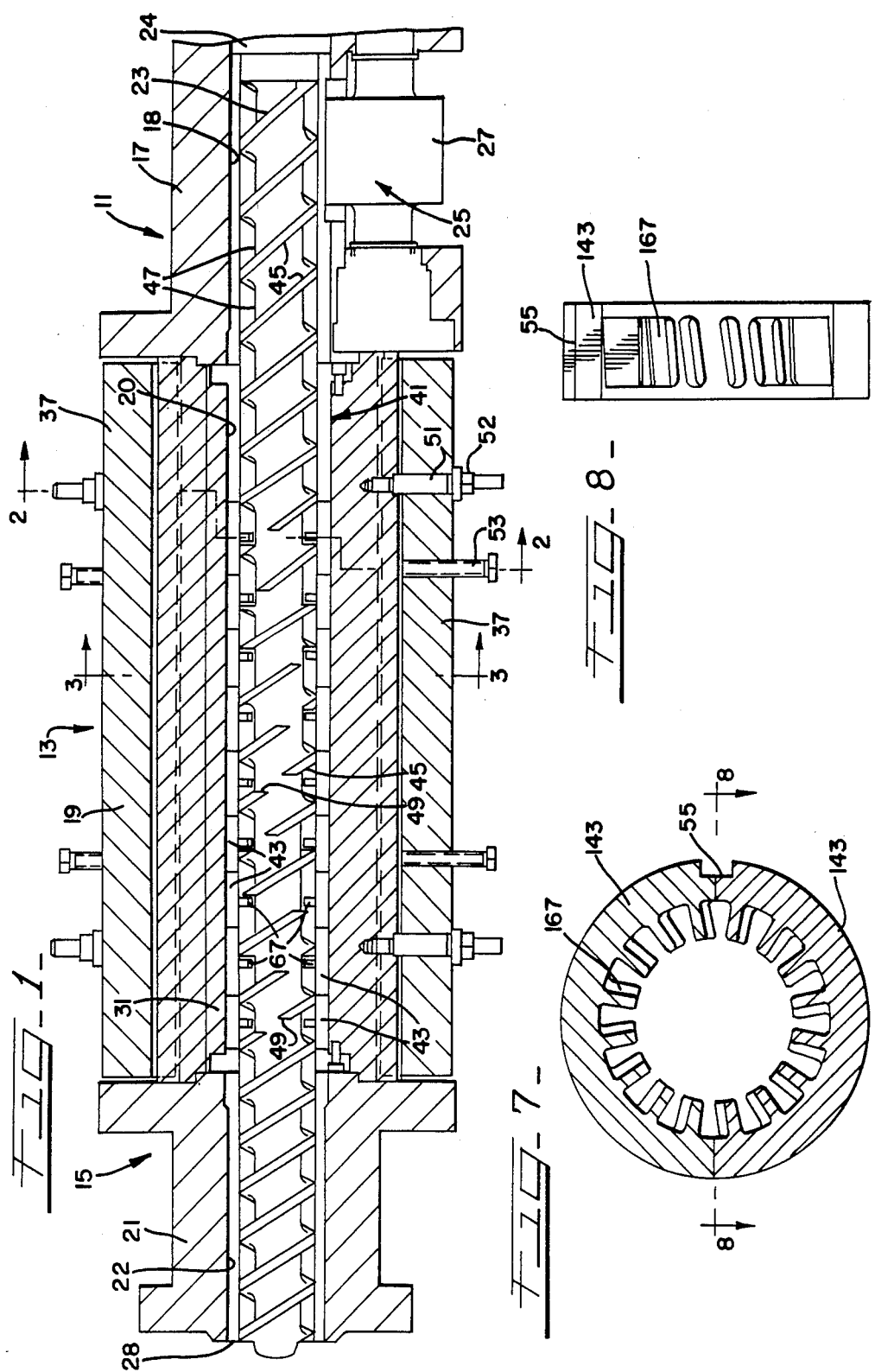

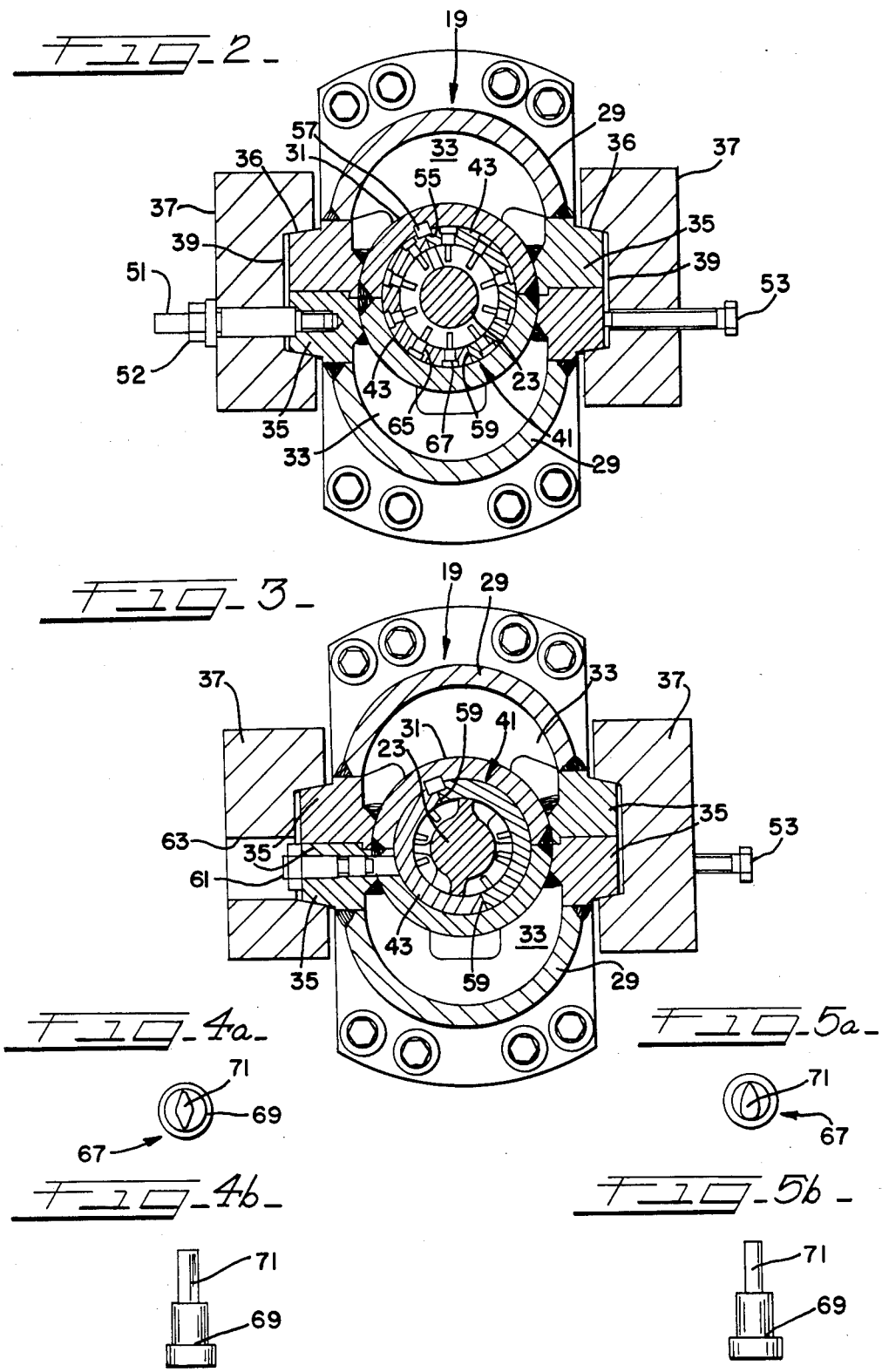

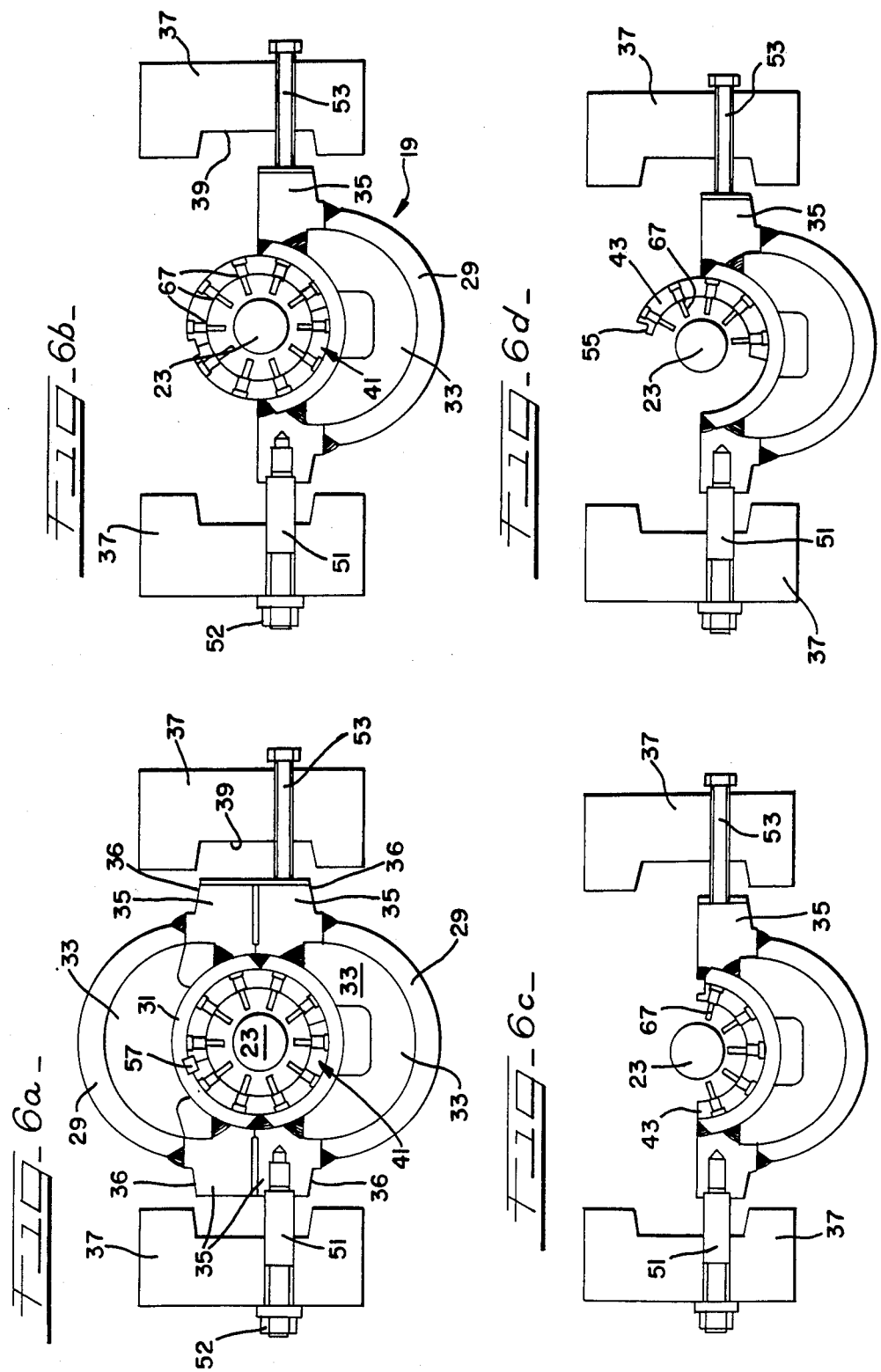

EXTRUDER FOR RUBBER MATERIALS

FIELD AND BACKGROUND OF THE INVENTION

The present invention relates to an extruder for mixing, homogenizing and extruding rubber materials, such as natural rubber and synthetic rubber.

A conventional extruder of this type, as shown in Japanese patent publication No. 56-53500 published on Dec. 19, 1981 and claiming priority from West German application No. P 22 35 784.2 filed on July 21, 1972, includes a casing forming a cylindrical bore that contains a rotatable screw which forms a spiral passage for rubber materials in the casing. A number of mixing pins radially extend through the casing, so that adjustable lengths of the pins project into the spiral passage. Some of the pins extend through a space in the casing formed for a heating or cooling medium. The thread of the screw is formed with notches for the pins to pass through when the screw rotates.

In a conventional extruder of the foregoing type, it is troublesome to adjust the projecting lengths of the pins, and the arrangement limits the volume of the space for the cooling medium. In addition, the medium may leak through seals around the pins.

It is a general object of the present invention to provide an extruder for rubber materials, which enables mixing means such as pins to be easily replaced to obtain the desired projecting lengths and intervals (pitch) depending on the type of the material being processed, and for easy inspection and repair.

It is another object of the invention to provide such an extruder which has a sufficient flow volume for a heating/cooling medium, without leakage of the medium.

It is a further object of the invention to provide such an extruder containing a spiral passage, wherein the undesirable resistance to the flow of the materials is reduced, thereby improving the mixing effect.

SUMMARY OF THE INVENTION

An extruder according to the invention includes a casing which forms a cylindrical bore and a peripheral passage for a heating or cooling medium around the bore. A screw is mounted in the bore and axially fixed to the casing, but adapted to be rotated in the bore. The screw has a thread forming a spiral passage for rubber materials in the bore. A number of projections extend from the casing and into the spiral passage. The thread is formed with notches for the projections to pass through as the screw rotates. A cylindrical sleeve is mounted within the casing and supports the projections. The casing and the sleeve are divided or split into at least two parts, and lock means is provided on the casing to lock the parts together during operation.

BRIEF DESCRIPTION OF THE DRAWINGS

Preferred embodiments of the invention are now described with reference to the accompanying figures of the drawings, wherein:

FIG. 1 is a plan view in axial cross section of an extruder according to a first embodiment of the invention;

FIG. 2 is a cross-sectional view taken along line 2—2 of FIG. 1;

FIG. 3 is a cross-sectional view taken along line 3—3 of FIG. 1;

FIGS. 4a and 4b are end and side views, respectively, of one form of pins as shown in FIGS. 1-2;

FIGS. 5a and 5b are end and side views, respectively, of another form of the pins as shown in FIGS. 1-2;

FIGS. 6a to 6d are views similar to FIG. 2, but showing how the parts of the extruder are disassembled;

FIG. 7 is a radial cross-sectional view of a modified sleeve according to the invention; and FIG. 8 is a view taken along line 8—8 of FIG. 7.

With reference to FIG. 1, an extruder includes an inlet section 11 into which rubber materials are fed, a main or center section 13 in which the materials are mixed together, and a head section 15 from which the mixture is extruded in a predetermined cross-sectional shape.

The sections 11, 13 and 15 include tubular casings 17, 19 and 21, respectively, which are secured together in end-to-end relationship. The three casings have aligned cylindrical bores 18, 20 and 22 formed through them, and a rotatable screw 23 extends through the bores. The screw 23 is journalled at both ends by bearings on the casings 17 and 21, and it is coupled at one end thereof to a drive (not shown).

The inlet casing 17 has its bore 18 closed at its rear end by a closure 24, and an inlet port 25 is formed in one side. The port 25 is provided with a feeder 27 and a hopper (not shown) may be provided on the feeder. The head casing 21 has an open front end 28.

As shown in FIGS. 2-3, the center casing 19 includes an outer axially extending wall 29 which is oval in radial cross section, and an inner cylindrical wall 31. The casing 19 is circumferentially divided into upper and lower halves.

Each casing half is formed with a longitudinal passage 33 between the outer and inner walls 29 and 31 for the flow of a heating/cooling medium for maintaining the materials being processed at a desired temperature.

Each casing half also has a pair of longitudinal flanges 35 projecting outwardly from the outer wall 29 on both side edges thereof. Provided adjacent the flanges 35 are a pair of longitudinally extending clamps 37, each formed with a longitudinal groove 39 therein for engagement with the flanges 35 on one side of the casing 19 when closed. The clamps 37 engage tapered outer surfaces 36 of the flanges 35 and tightly secure the flanges (and the casings) together. The flanges, as shown in FIG. 2, are fastened to the outer and inner walls.

The inner casing walls 31 surround a tubular sleeve 41 which is circumferentially divided into two half circle parts, and the two parts are axially divided to form a plurality of axially aligned pairs of arcuate segments 43.

The screw 23 has a pair of spiral ribs or double male threads 45, which form spiral passages 47 for the rubber materials inside the sleeve 41. The outer surfaces of the threads are closely adjacent the inner surface of the sleeve 41. The threads 45 have a pitch which reduces gradually from the rear end 24 of the inlet section 11 to the front end of the main section 13. The pitch reduction produces a gradual increase in pressure on the materials to heat and mix them. The threads 45 of a section of the screw within the center casing 13 are formed with axially spaced pairs of circumferentially aligned notches 49 therein.

As shown in FIGS. 1-2, a plurality of bolts 51 extend loosely through the clamps 37 and are threaded into the lower casing flanges 35. Threaded on the bolts 51 are nuts 52 for engagement with the clamps 37 to clamp the halves of the casing 19 and the segments 43.

Threaded holes are formed through the clamps 37 and a plurality of releasing bolts 53 are threaded into the holes and engage the lower flanges 35. By screwing the bolts 53 in, the clamps are pushed away and released. The bolts 51 and 53 are provided alternately along the length of the clamps 37, but only some of the bolts are shown in FIG. 1.

The arcuate segments 43 of the sleeve 41 and the inner wall 31 of the upper casing half are formed with corresponding axial grooves 55 for engagement with an axially extending key 57 (FIGS. 2 and 6a) to normally fix them together and prevent relative rotation. The grooves 55 are positioned so as to angularly displace the diametrical border edges 59 of the segments 43 away from the side flanges 37 of the casing, as shown in FIG. 2.

As shown in FIG. 3, a plurality of tightening bolts 61 are threaded through one of the lower flanges 35, and extend through the casing 19 in parallel with the bolts 51 and 53. Each bolt 61 is provided for engagement with one arcuate segment 43 of each pair at an angular location away from the border edges 59. The bolts 61 can be passed through holes 63 formed in the appropriate clamp 37, in order to more positively clamp the segments 43 in addition to the clamping by the clamps 37.

As shown in FIG. 2, each segment 43, except for those at both ends, is formed with a number of circumferentially aligned radial holes 65. Each hole 65 has an inner bore portion and a radially outer counterbore which is increased in diameter relative to the inner bore. The holes 65 are aligned with the notches 49 of the threads of the screw. Through each hole 65 extends a pin 67. As shown in FIGS. 4a, 4b, 5a and 5b, each pin 67 has a double diameter head 69 for rotatable engagement within a hole 65, and a smaller diameter leg 71 which projects radially inwardly from the associated segment 43 into one spiral passage 47. The leg 71 is axially located to pass through the thread notches 49 when the screw 23 rotates. This construction enables a larger number of pins 67 to be provided for more uniform mixing of the materials. As shown in FIGS. 4a and 5a, the legs 71 preferably have a tapered or streamlined shape.

In operation, with reference to FIG. 1, the screw 23 is rotated by a drive. Rubber materials are fed through the intake port 25 into the inlet section 11, and thrusted axially forwardly (toward the left) by the screw 23 to the main section 13. In addition, because the pitch of the threads 45 decreases in the forward direction, the materials are thrusted spirally forwardly along the passages 47 with increasing pressure, and consequently kneaded and mixed. The materials then move in contact with the stationary (and rotatable) pins 67, which promote the mixing.

The materials move at various angles depending on the pitches of the threads 45 and the firmness of the materials. As previously mentioned and as shown in FIGS. 4a and 5a, the pins 71 are preferably streamlined or tapered, and the pins are rotatable in their holes. The flow of the processed material causes the rotatable pins 67 to rotate to the positions where they have the minimum resistance to flow. This also reduces the loads on the pins.

The mixed material is extruded from the open end 28 of the head section 15 in a predetermined cross-sectional shape which is determined by this shape of the opening 28 or a die (not shown).

The pins 67 may have a shape and/or length depending upon and suited to a specific type of material. The pins may be replaced depending on the nature of the material, or the sleeve 41 can be disassembled for inspection and repair, in the following manner:

The tightening bolts 61 (FIG. 3) and the nuts 52 (FIGS. 1-2) are released.

As shown in FIG. 6a, the releasing bolts 53 are threaded into the clamps 37 to push the clamps from the casing flanges 35.

As shown in FIG. 6b, the upper half of the casing 19 and the key 57 are separated from the lower half and removed.

As shown in FIG. 6c, one or more pairs of arcuate segments 43 are rotated by a necessary angle to the position where the upper segment is accessible, and the upper segment is removed.

As shown in FIG. 6d, the lower segment 43 is then rotated upwardly and removed.

New pins and segments can then be assembled in the reverse order.

The second embodiment shown in FIGS. 7-8 differs from the first embodiment in that the second includes arcuate segments 143 with a number of fins 167, instead of the pins. The fins 167 are formed integrally with and extend inwardly from the inner surfaces of the segments 143, inwardly toward the screw (not shown) and the fins are at an angle with respect to the axis of the segments 143 and the screw. The shape and direction of the fins 167 are predetermined depending on the pitch of the screw threads and the kind of the materials being processed.

In any of the embodiments, the sleeve 41 may otherwise include a number of undivided rings (not shown) without pins 67 or fins 167, which are interposed between other axially shortened arcuate segments (also not shown) which are provided with pins or fins. Also, the sleeve 41 may be circumferentially divided into three or more arcuate segments instead of two as illustrated.

The major advantages of the extruder according to this invention are as follows:

A. The main body of the apparatus can be disassembled and assembled, and particularly the sleeve having pins or fins can be replaced. This facilitates repair and inspection, and permits replacement with a sleeve having pins or fins suitable for the types of rubber materials to be processed.

B. The heating/cooling medium passages 33 are formed in the casing body, which is separate from the sleeve having pins or fins. This enables the passages to have a sufficiently large volume. Also, the pins do not extend through the passages, thus preventing the medium from leaking around pins.

What is claimed is:

1. An extruder comprising a casing having a cylindrical bore formed therein and passages outside of said bore for a heating or cooling medium, a screw mounted in said bore and adapted to be rotated, said screw having a thread which forms a spiral passage for material to be processed in the bore, a cylindrical sleeve mounted in said bore around said screw, a plurality of projections extending from said sleeve and into said spiral passage, said thread having notches for the projections to pass through when the screw rotates, said sleeve supporting said projections, said casing and said sleeve each being circumferentially split into at least two parts, and lock means on said casing for releasably locking said parts together.

2. An extruder according to claim 1, wherein said sleeve is axially divided into a plurality of arcuate segments.

3. An extruder according to claim 2, wherein said projections comprise thin pins supported rotatably on at least one of said segments.

4. An extruder according to claim 2, wherein said projections comprise fins formed on at least one of the segments, said fins extending at an angle with respect to the axis of the sleeve.

* * * * *